J. A. V. TURCK.
BEARING.
APPLICATION FILED FEB. 21, 1919.
1,416,246.
Patented May 16, 1922.
2 SHEETS—SHEET 2.
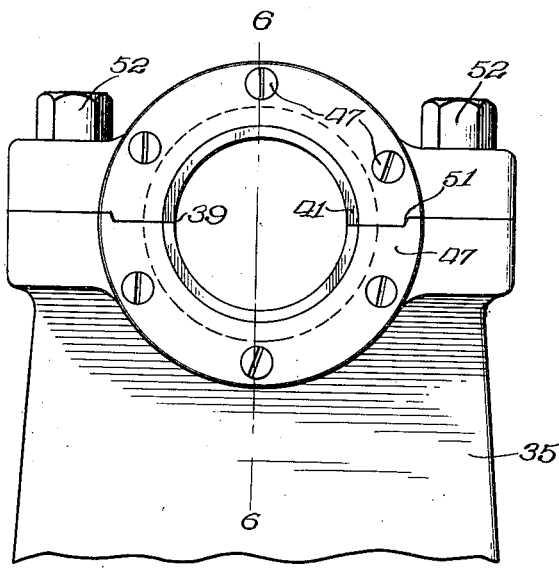
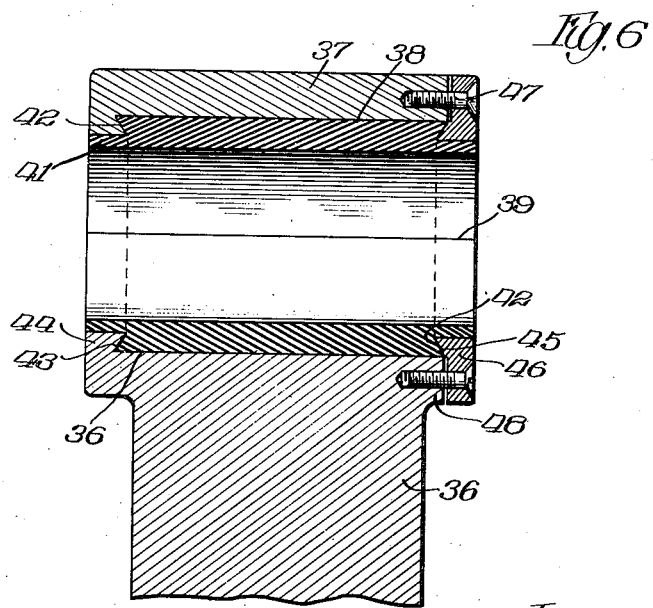

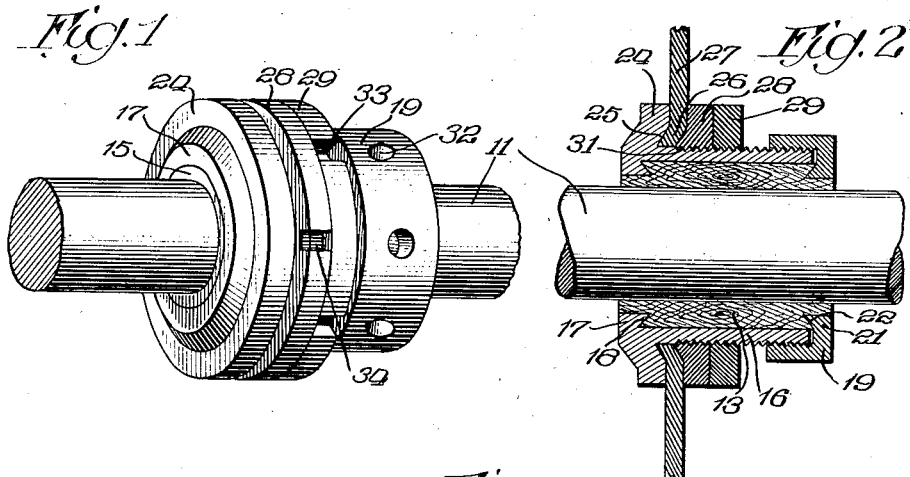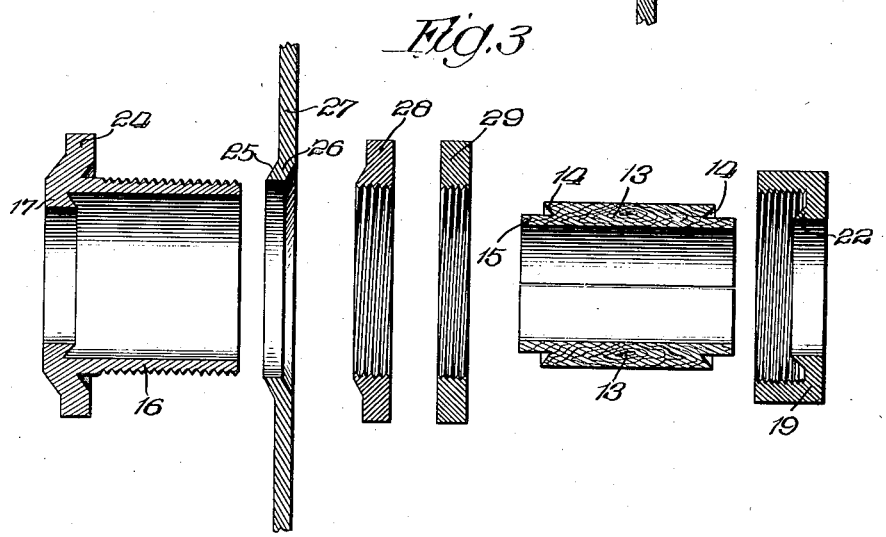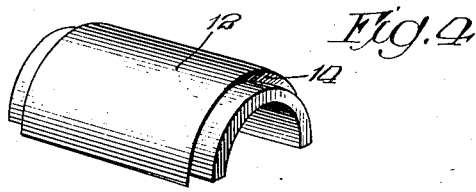

UNITED STATES PATENT OFFICE.

JOSEPH A. V. TURCK, OF WILMETTE, ILLINOIS, ASSIGNOR TO FELT & TARRANT MFG. CO., OF CHICAGO, ILLINOIS, A CORPORATION OF ILLINOIS.

BEARING.

1,416,246.      Specification of Letters Patent.      Patented May 16, 1922.

Application filed February 21, 1919. Serial No. 278,539.

*To all whom it may concern:*

Be it known that I, JOSEPH A. V. TURCK, a citizen of the United States, residing in Wilmette, in the county of Cook and State of Illinois, have invented a new and useful Improvement in Bearings, of which the following is a specification.

This invention relates in general to bearings and has more particular reference to lubricated bearings so constructed and designed that it is impossible for the lubricant to escape or ooze out upon surrounding parts. The invention contemplates the provision of a fibre or wood body impregnated with a suitable lubricant and used as a bearing material.

It is a principal object of this invention to provide a bearing of this character which can be used in delicate mechanisms and which will be prevented by reason of its construction from wide variations in the character of its bearing contact due to expansion and contraction, and particularly circumferential expansion and contraction, i. e., the provision of a bearing which will maintain substantially the bearing contact provided in its initial construction under a wide range of climatic and temperature conditions.

Another important object of the invention is the provision of a new and improved manner of holding a bearing of this character in accurate relation and at the same time protecting it from damage.

Numerous other objects and advantages of the invention will be apparent as it is better understood from the following description when considered in connection with the accompanying drawing illustrating the same.

On the drawing,

Figure 1 is a perspective view of a bearing embodying my present invention.

Fig. 2 is a longitudinal section through the same;

Fig. 3 is a view of the several parts shown in Figs. 1 and 2, said parts being separated;

Fig. 4 is a perspective view of the impregnated fibre portion of the bearing;

Fig. 5 is an end elevation of a slightly different mounting for a bearing embodied in my present invention and showing the application of the invention to a block construction, and Fig. 6 is a section on the line 5—5 of Fig. 1.

My invention contemplates the provision of a fibre member impregnated with any suitable lubricant and slit in one or more places, (two being shown on the drawing), to permit it to expand and contract circumferentially without buckling or breaking in the bearing housing. In a bearing embodying my present invention the housing is constructed to confine or direct this contraction and expansion in such manner that the presentation of the bearing face to the moving part will not be materially altered under changing conditions; all of which will now be more fully explained.

Referring first to Figs. 1 to 4 reference character 11 indicates a shaft or interior journal element which may be considered the moving member and for which it is desired to provide a bearing of the character earlier mentioned and embodying my invention. This bearing comprises an impregnated wooden or fibre sleeve cut longitudinally in the present instance to produce two halves 12 adapted when reassembled to form a cylindric bearing for the shaft 11. The ends of these members or halves are undercut as indicated at 14 leaving the central parts 13 thicker than the extreme ends 15. The housing for the bearing in the present instance comprises a sleeve 16 having at one end an inwardly extending wall 17 undercut on its inner face for engagement in the under-cut 14 at one end of the cylindrical fibre part of the bearing. This sleeve is engaged by a second housing member 19 having also an inwardly extending wall or flange 21 provided with an under-cut 22.

The housing members 16 and 19 are threadedly connected so that the two inwardly extending walls or flanges 17 and 21 may clamp the ends of the fibre part of the bearing, the under-cut portions of the housing and impregnated parts co-operating and interlocking to form a dovetail connection, the two housing members forming the groove and the fibre body the tongue of this connection. The fibre portion of the bearing is preferably relatively thin so that the radial expansion and contraction of these parts is of relatively little extent and the housing embodying my invention, because of the engagement of its continuous circumferential walls with the bearing body between portions thereof and the journal element, permits circumferential expansion and contraction while holding the bearing body or fiber members to proper curvature and from clamping too tightly on the shaft.

In order that the bearing may be easily fastened in place in a mechanism of which it forms a part I have shown on the drawings a flange 24 extending outwardly radially and formed integral with the sleeve 16 at an end of the sleeve. This wall or flange is offset or undercut at 25 and a similar formation is given the material 26 about a hole or aperture in the member 27 in and to which it is desired to secure the bearing. Two lock nuts 28 and 29 may be provided to screw upon the body of the sleeve 16 to clamp the part 27 against the flange 24. Suitable formation, as for example apertures or recesses 32, 33 and 34, may be given the several parts as indicated in Fig. 1 for screwing them into and out of place. The application of the invention just described is used merely for the purposes of illustration and it will be understood that the bearing may be held in place in any suitable fashion.

Figs. 5 and 6 show the arrangement of the bearing in a block construction. Reference character 35 indicates the support having at its top a semi-cylindric opening 36 upon which may be positioned a top 37 having a companion opening 38 which forms with the opening 36 a cylindric passageway through which the shaft or other moving part (not shown) may extend. The fibre member as before is slitted at 39 and is provided at its ends 41 with under-cuts 42 adapted to engage at one side in an under-cut 43 of a flange or wall 44 extending inwardly into the opening 36 at one side. At the other side the under-cut 42 is adapted for similar engagement by an under-cut 45 of a segmental holding ring 46 held in place by screws 47 taking into an adjacent part 48 of the block support and into the cover. The adjacent or contacting faces of the segmental ring and of the block support and its cover may if desired have the usual offset construction indicated at 51 and bolts 52 are provided to hold the cover and support rigidly connected together.

When mounted in a housing of this character the action of the fibre part of the bearing is identically the same as that described in connection with the discussion of Figs. 1 to 4. The dovetail connection between the segmental members of the ring at one side and the housing at the other with the split fibre member corresponds accurately as will be manifest with the dovetail connection shown in Figs. 1–4. And each of these dovetail connections confines circumferential contraction and expansion to the original and desired curvature so that the bearing is held at all times positively from clamping upon the shaft or other moving member.

It is thought that the invention and many of its attendant advantages will be understood from the foregoing description, and it will be apparent that various changes may be made in the form, construction and arrangement of the parts without departing from the spirit and scope of the invention as it is claimed or without sacrificing all of its material advantages, the description of the embodied invention hereinbefore set forth being merely for the purpose of illustration.

I claim:

1. A bearing comprising an impregnated fiber body slit longitudinally and a housing within which the fiber body is bodily inserted, said housing having a dovetail connection with said body, whereby said body is kept from deformation tending to cause the bearing to bind.

2. A bearing comprising a lubricant-impregnated body slit longitudinally and a housing within which said body is bodily inserted, said housing having a dovetail connection with said body, whereby said body is kept from deformation tending to cause the bearing to bind.

3. A bearing comprising a body formed of friction-reducing material slit longitudinally and a housing within which said body is bodily inserted, said housing having a dovetail connection with said body, whereby said body is kept from deformation tending to cause the bearing to bind.

4. A contractible bearing body adapted to surround an interior journal element, and a housing therefor having continuous circumferential walls which engage within said bearing body between portions thereof and the journal element so as to confine its movement to a circular path and prevent binding pressure of the bearing body on said journal element.

5. The combination with a contractible bearing body formed of lubricant-impregnated fibrous material and adapted to surround an interior journal element, of a housing within which the bearing body is bodily inserted, said housing having continuous circumferential walls which engage within said bearing body between portions thereof and the journal element, so as to confine its movement to a circular path and prevent binding pressure of the bearing body on said journal element.

6. A bearing comprising a housing containing a relatively-movable shrinkable bearing-body, said housing having means engaging said body to confine its shrinkage or expansion to an annular path and prevent deformation tending to bind the journal.

7. A bearing comprising a body formed of friction reducing material which is shrinkable in a circumferential direction, said body being slit longitudinally and adapted to surround an interior journal element, and means structurally independent of the journal element and of the bearing body for confining circumferential shrinkage and expansion to an annular path of fixed inner radius, whereby said body is kept from deformation tending to cause the bearing to bind on a journal element.

In testimony whereof I have hereunto set my hand in the presence of two subscribing witnesses.

JOSEPH A. V. TURCK.

Witnesses:
THOMAS J. O'BRIEN,
ETHEL WOOD.